(12) United States Patent
Jang et al.

(10) Patent No.: US 11,775,840 B2
(45) Date of Patent: Oct. 3, 2023

(54) NON-TRANSITORY COMPUTER-READABLE MEDIUM STORING PROGRAM CODE GENERATING WAFER MAP BASED ON GENERATIVE ADVERSARIAL NETWORKS AND COMPUTING DEVICE INCLUDING THE SAME

(71) Applicant: Samsung Electronics Co., Ltd., Suwon-si (KR)

(72) Inventors: Wonik Jang, Suwon-si (KR); Sanghoon Myung, Goyang-si (KR); Changwook Jeong, Hwaseong-si (KR); Sunghee Lee, Osan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 443 days.

(21) Appl. No.: 16/909,132

(22) Filed: Jun. 23, 2020

(65) Prior Publication Data

US 2021/0158173 A1 May 27, 2021

(30) Foreign Application Priority Data

Nov. 26, 2019 (KR) .......................... 10-2019-0153770

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ...................................................... G06N 3/088
See application file for complete search history.

(56) References Cited

U.S. PATENT DOCUMENTS

| | | | |
|---|---|---|---|
| 2018/0157933 A1* | 6/2018 | Brauer | G06V 10/764 |
| 2018/0330493 A1* | 11/2018 | Milligan | G06K 9/6256 |
| 2019/0050979 A1 | 2/2019 | Park et al. | |
| 2019/0096659 A1* | 3/2019 | Xu | G06N 3/0454 |
| 2019/0188839 A1 | 6/2019 | Stewart et al. | |
| 2019/0228516 A1 | 7/2019 | Umeda et al. | |
| 2019/0287230 A1* | 9/2019 | Lu | G06N 3/0472 |
| 2021/0150688 A1* | 5/2021 | Bidault | G06N 3/08 |

FOREIGN PATENT DOCUMENTS

| | | |
|---|---|---|
| KR | 101561785 B1 | 10/2015 |
| KR | 10-2019-0081843 A | 7/2019 |

OTHER PUBLICATIONS

Aggarwal, Neural Networks and Deep Learning, Springer International Publishing AG, Aug. 25, 2018, pp. 438-448 (Year: 2018).*

* cited by examiner

*Primary Examiner* — Raymond L Nimox
(74) *Attorney, Agent, or Firm* — HARNESS, DICKEY & PIERCE, P.L.C.

(57) ABSTRACT

A non-transitory computer-readable medium storing a program code including an image generation model, which when executed, causes a processor to input input data including sampling data of some of a plurality of semiconductor dies of a wafer to a generator network of the image generation model and output a wafer map indicating the plurality of semiconductor dies, and to input the wafer map output from the generator network to a discriminator network of the image generation model and discriminate the wafer map.

19 Claims, 13 Drawing Sheets

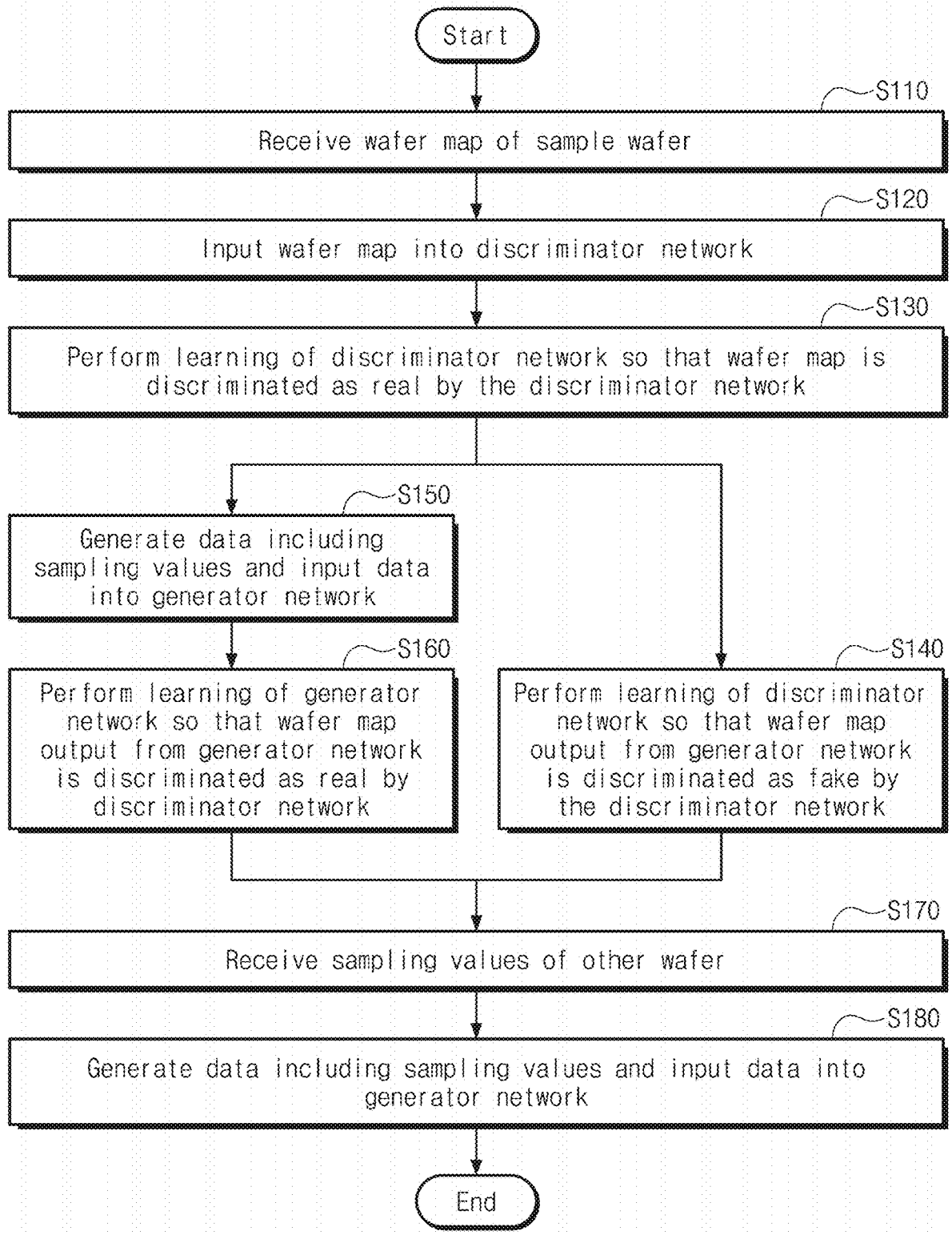

NON-TRANSITORY COMPUTER-READABLE MEDIUM STORING PROGRAM CODE GENERATING WAFER MAP BASED ON GENERATIVE ADVERSARIAL NETWORKS AND COMPUTING DEVICE INCLUDING THE SAME

CROSS-REFERENCE TO RELATED APPLICATIONS

This application claims priority under 35 U.S.C. § 119 to Korean Patent Application No. 10-2019-0153770 filed on Nov. 26, 2019, in the Korean Intellectual Property Office, the disclosures of which are incorporated by reference herein in their entireties.

BACKGROUND

Embodiments of the inventive concepts described herein relate to a non-transitory computer-readable medium storing a program code generating a wafer map based on generative adversarial networks and a computing device including the same.

A wafer map may indicate various characteristics of a plurality of semiconductor dies formed on a wafer. The wafer map may be used to select a plurality of semiconductor dies and to check the yield. However, a way to generate the wafer map based on results measured from all the semiconductor dies may require too much cost and/or time. An artificial neural network may be used in various fields, such as machine learning, selection, inference, prediction, recognition, analysis, translation, and diagnosis. For example, an artificial neural network may be used to generate, analyze, or discriminate an image. Also, an artificial neural network may be used for a semiconductor manufacturing process.

SUMMARY

Some example embodiments of the inventive concepts provide a non-transitory computer-readable medium storing a program code generating a wafer map based on generative adversarial networks and a computing device including the same.

According to example embodiments, a non-transitory computer-readable medium storing a program code including an image generation model, which when executed, causes a processor to input input data including sampling data of some of a plurality of semiconductor dies of a wafer to a generator network of the image generation model and output a wafer map indicating the plurality of semiconductor dies, and to input the wafer map output from the generator network to a discriminator network of the image generation model and discriminate the wafer map.

According to example embodiments, a non-transitory computer-readable medium storing a program code including an image generation model, which when executed, causes a processor to perform learning of a discriminator network of the image generation model so that the discriminator network discriminates a first wafer map including a plurality of sampling values measured from a plurality of semiconductor dies of a wafer as real and discriminates a second wafer map output from a generator network of the image generation model, to which some of the plurality of sampling values are input, as fake, and to perform learning of the generator network so that the second wafer map output from the generator network is discriminated as real by the discriminator network.

According to example embodiments, a computing device comprising a processor configured to execute an image generation model stored in a memory. The processor performs learning of a discriminator network of the image generation model so that the discriminator network discriminates a first wafer map of a first wafer including a plurality of first sampling values measured from a plurality of first semiconductor dies of the first wafer as real and discriminates a second wafer map of the first wafer output from a generator network of the image generation model, to which some of the plurality of first sampling values are input, as fake, to perform learning of the generator network so that the second wafer map output from the generator network is discriminated as real by the discriminator network, and to input some of second sampling values measured from some of a plurality of second semiconductor dies of a second wafer to the generator network and generate a third wafer map of the second wafer.

BRIEF DESCRIPTION OF THE FIGURES

The above and other objects and features of the inventive concepts will become apparent by describing in detail example embodiments thereof with reference to the accompanying drawings.

FIG. 13 is a flowchart illustrating operations in which a processor according to example embodiments of the inventive concepts performs learning of an image generation model stored in a memory, executes the learned image generation model, and generates a wafer map.

DETAILED DESCRIPTION

Below, some example embodiments of the inventive concepts will be described in detail and clearly to such an extent that an ordinary one in the art easily implements the inventive concepts.

Figure 1:
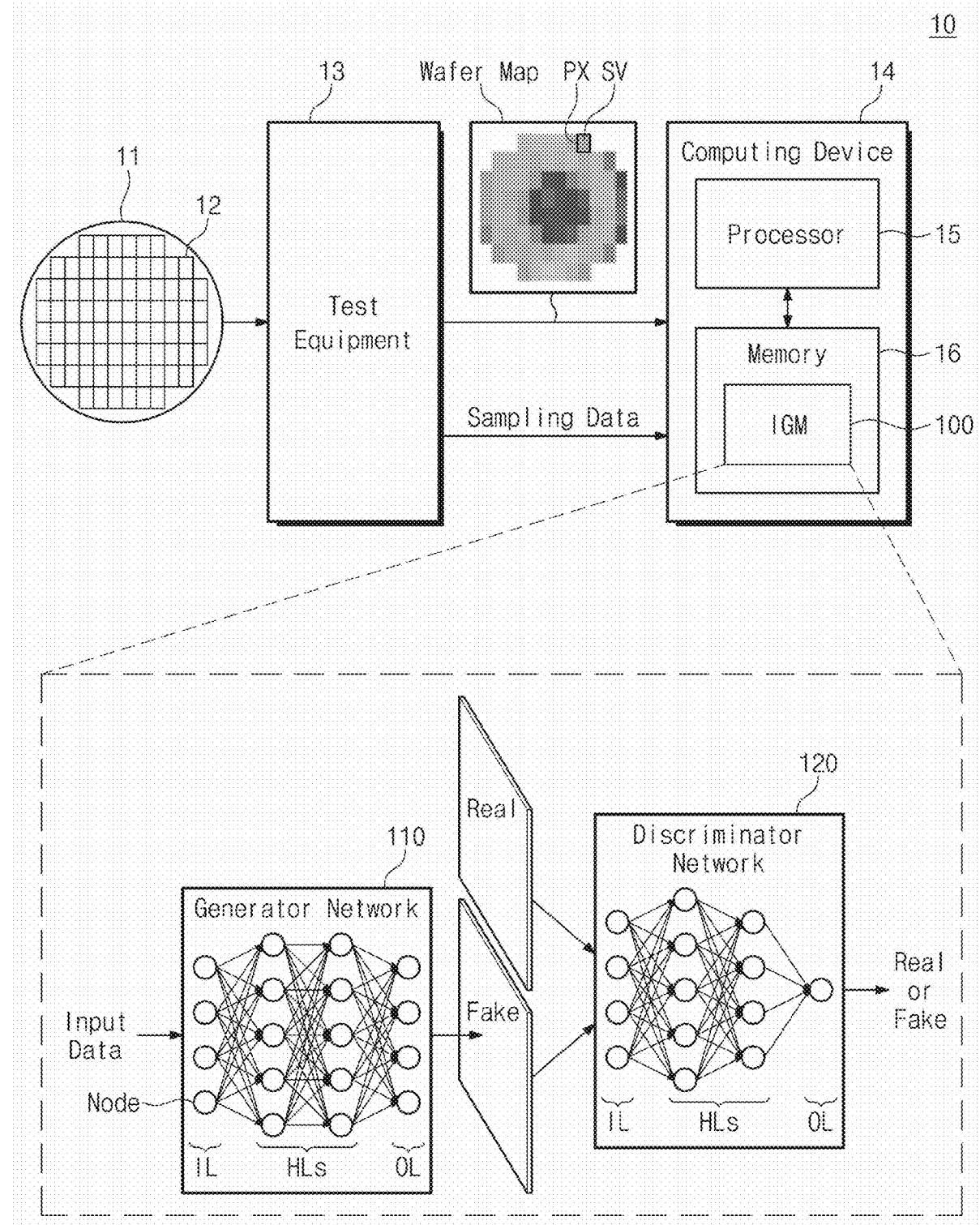
FIG. 1 illustrates a wafer monitoring system according to example embodiments of the inventive concepts.

FIG. 1 illustrates a wafer monitoring system according to example embodiments of the inventive concepts. A wafer monitoring system 10 may be referred to as a "wafer test system", a wafer map generating system", a "semiconductor manufacturing process monitoring system", or a "semiconductor manufacturing system". The wafer monitoring system 10 may include test equipment 13 and/or a computing device 14.

The test equipment 13 may test a wafer 11 and may generate a wafer map of the wafer 11. A plurality of semiconductor dies 12 may be disposed or implemented on the wafer 11. The test equipment 13 may test and measure characteristics of the plurality of semiconductor dies 12. For example, the test equipment 13 may measure various characteristics of the plurality of semiconductor dies 12, such as gate-induced drain leakage (GIDL), drain-induced barrier lowering (DIBL), current, power, operating frequency, threshold voltage, latency, timing margin, and/or lifetime, and may generate a wafer map indicating the characteristics of the plurality of semiconductor dies 12. The test equipment 13 may sample the characteristics of the plurality of semiconductor dies 12. Characteristics of a plurality of semiconductor dies 12 sampled by the test equipment 13 may correspond to a plurality of sampling values SV (alternatively referred to as "measurement values").

The wafer map may correspond to an image including a plurality of pixels PX. The plurality of pixels PX may indicate the plurality of sampling values SV, which are the characteristics of the plurality of semiconductor dies measured by the test equipment 13, by using shading. A pixel may be referred to a "shot". For example, the sampling value SV of the semiconductor die 12 corresponding to a relatively dark pixel PX may be different from the sampling value SV of the semiconductor die 12 corresponding to a relatively bright pixel PX. The semiconductor dies 12 corresponding to the pixels PX having similar shade may have similar sampling values SV. The wafer map may indicate the plurality of sampling values SV mapped onto locations of the plurality of semiconductor dies 12 on the wafer 11.

An example is illustrated in FIG. 1 as the number of semiconductor dies 12 on the wafer 11 is equal to the number of sampling values SV on the wafer map, but the number of semiconductor dies 12 and the number of sampling values SV may be different. For example, one sampling value may indicate an average value or a representative value of characteristics of two or more semiconductor dies. The number of semiconductor dies 12 and the number of sampling values SV may be different, and the inventive concepts are not limited to the example illustrated in FIG. 1. A size of the wafer 11 and a size of the wafer map may be identical to or different, and the size of the wafer map may be enlarged or reduced based on the size of the wafer 11 at a given ratio.

In some embodiments, each of the plurality of semiconductor dies 12 may be used to implement a memory device such as a dynamic random access memory (DRAM) device, a static random access memory (SRAM) device, a thyristor random access memory (TRAM) device, a NAND flash memory device, a NOR flash memory device, a resistive random access memory (RRAM) device, a ferroelectric random access memory (FRAM) device, a phase change random access memory (PRAM) device, or a magnetic random access memory (MRAM) device; a processing device such as a central processing unit (CPU), an image signal processing unit (ISP), a digital signal processing unit (DSP), a graphics processing unit (GPU), a vision processing unit (VPU), or a neural processing unit (NPU); a system on chip (SoC); an application specific integrated circuit (ASIC); alternatively, a field-programmable gate array (FPGA).

The computing device 14 may communicate with the test equipment 13. The computing device 14 may include a processor 15 and a memory 16. The computing device 14 may be referred to as an "electronic device" or an "image generation device". The processor 15 that is a hardware device may execute an image generation model 100 that is stored in the memory 16. For example, the processor 15 may include a cache memory that is shared by homogeneous or heterogeneous cores such as CPU, ISP, DSP, GPU, VPU, and NPU. The processor 15 may perform processing operations and arithmetic operations, which are associated with instructions of a program code describing the image generation model 100, such as fetch, execution, data request, and/or data store. The number of processors included in the computing device 14 may be one or more.

The memory 16 may be a non-transitory computer-readable medium, which stores the program code including the image generation model 100 executable by the processor 15, that is, a hardware device. For example, the memory 16 may be implemented by using various memory devices described above, and the number of memories included in the computing device 14 may be one or more. Also, the memory 16 may be implemented with an external device capable of communicating with the computing device 14.

The image generation model 100 that is stored in the memory 16 and is executed by the processor 15 may include a generator network 110 and/or a discriminator network 120. The generator network 110 may be referred to as a "generator" or a "generation unit", and the discriminator network 120 may be referred to as a "discriminator" or a "discrimination unit". For example, the image generation model 100 may be generative adversarial networks (GANs) including the generator network 110 and the discriminator network 120. The processor 15 may provide input data to the generator network 110, and the generator network 110 may generate and output a fake image based on the input data. The processor 15 may input a real image to the discriminator network 120. For another example, the processor 15 may input the fake image to the discriminator network 120. The discriminator network 120 may discriminate whether the input image is real or fake (or may classify the input image as a real image or a fake image). For example, the discriminator network 120 may perform binary classification on the input image.

In some embodiments, the test equipment 13 may test all the semiconductor dies 12 on the wafer 11, may generate a wafer map including the plurality of pixels PX indicating the plurality of sampling values SV of the plurality of semiconductor dies 12, and may transmit the wafer map to the computing device 14. In some example embodiments, the test equipment 13 may test first semiconductor dies 12 (corresponding to some) of the plurality of semiconductor dies 12 on the wafer 11, may generate sampling values SV of the first semiconductor dies 12, and may transmit the sampling values SV of the first semiconductor dies 12 to the computing device 14. In some embodiments, the computing device 14 may generate wafer maps with reference to the sampling data. Although not illustrated in FIG. 1, the computing device 14 may further include an interface circuit that requests or receives a wafer map or sampling data of the wafer 11 under control of the processor 15.

In some embodiments, the generator network 110 may include a plurality of nodes. The plurality of nodes may form an input layer IL, a plurality of hidden layers HL, and/or an output layer OL. Each of the plurality of nodes may store a weight and a bias. As a weight and a bias are updated by the processor 15, the learning or training of the generator network 110 may be performed. The discriminator network 120 may also include a plurality of nodes. The plurality of nodes may form an input layer IL, a plurality of hidden layers HL, and/or an output layer OL. Each of the plurality of nodes may store a weight and a bias. As a weight and a bias are updated by the processor 15, the learning or training of the discriminator network 120 may be performed. For example, a node may be referred as a "neuron" or a "perceptron".

For example, the processor 15 may input a wafer map, which is generated by the test equipment 13 measuring all the semiconductor dies 12 on the wafer 11 and includes a plurality of sampling values SV measured from all the semiconductor dies 12, to the discriminator network 120 as a real image. The discriminator network 120 may discriminate whether the input image is real or fake. The processor 15 may perform the learning of the discriminator network 120 so that the discriminator network 120 discriminates a real image as real. The processor 15 may perform the learning of the discriminator network 120 so as to discriminate a wafer map output from the generator network 110 as fake (e.g., as a fake image).

At the beginning of the learning, when the discriminator network 120 discriminates a real image as fake (or a fake image as real), based on a result of the discrimination, the processor 15 may update or adjust weights or biases of the nodes of the discriminator network 120 (e.g., backpropagation). When the learning of the discriminator network 120 is completed, the discriminator network 120 may discriminate a real image as real or may discriminate a fake image as fake. The nodes of the input layer IL of the discriminator network 120 may receive a real image or a fake image, the nodes of the hidden layers HL of the discriminator network 120 may perform various operations (e.g., a convolution operation, a pooling operation, a down-sampling operation, a multiplication operation, an addition operation, and/or an activation operation) on a real image or a fake image input through the input layer IL, and the output layer OL of the discriminator network 120 may output a signal indicating whether an input image is real or fake.

For example, the processor 15 may input the plurality of sampling values SV, which are generated by the test equipment 13 measuring only second semiconductor dies (corresponding to some) of the plurality of semiconductor dies 12 on the wafer 11, to the generator network 110 as input data. The generator network 110 may generate and output a wafer map based on the input data or from the input data. As described above, the wafer map generated by the generator network 110 may be a fake image. The size of the wafer map generated by the generator network 110 may be equal to the size of the wafer map generated by the test equipment 13. The processor 15 may perform the learning of the generator network 110 so that the wafer map output from the generator network 110 is discriminated by the discriminator network 120 as real. For example, the processor 15 may initiate the learning of the generator network 110 after the learning of the discriminator network 120 is completed. At the beginning of the learning, when the discriminator network 120 discriminates the wafer map output from the generator network 110 as fake (or as a fake image), the processor 15 may update or adjust weights or biases of the nodes of the generator network 110 (e.g., backpropagation). When the learning of the generator network 110 is completed, the discriminator network 120 may discriminate the wafer map output from the generator network 110 as real (or as a real image) or may discriminate the wafer map output from the generator network 110 as real with the probability of about 50% or as fake with the probability of about 50%. The discriminator network 120 may fail to accurately discriminate whether the wafer map output from the generator network 110 is real or fake. For example, the generator network 110 may fake the discriminator network 120. The nodes of the input layer IL of the generator network 110 may receive the input data, the nodes of the hidden layers HL of the generator network 110 may perform various operations (e.g., a convolution operation, a deconvolution operation, an unpooling operation, an up-sampling operation, a multiplication operation, an addition operation, and/or an activation operation) on the input data input through the input layer IL, and the output layer OL of the generator network 110 may output the wafer map.

As a semiconductor manufacturing process progresses, a plurality of wafers 11 may be manufactured. Wafer maps of the plurality of wafers 11 are required to test and select the plurality of wafers 11. In some embodiments where the test equipment 13 generates wafer maps of all the wafers 11 based on results measured from semiconductor dies of all the wafers 11 (e.g., complete enumeration), a lot of time and/or cost are required. According to example embodiments of the inventive concepts, thus, the test equipment 13 may test not all the wafers 11 but some sample wafers 11 and may transmit sample wafer maps of the sample wafers 11 to the computing device 14. The processor 15 may utilize the sample wafer maps as training data. The processor 15 may input the sample wafer maps to the discriminator network 120 and may perform the learning of the discriminator network 120. The processor 15 may input some of the sampling values SV of the sample wafer maps to the generator network 110 and may perform the learning of the generator network 110. When the processor 15 completes the learning of the discriminator network 120 and the learning of the generator network 110 by using the training data, the test equipment 13 may test only some of the plurality of semiconductor dies 12 of each of the remaining wafers 11 other than the sample wafers 11 and may transmit sampling data including the sampling values SV measured from the some semiconductor dies 12 to the computing device 14. The processor 15 may input the sampling values SV as input data to the generator network 110, and the generator network 110 may generate and output wafer maps of the remaining wafers 11 from the sampling values SV. After the learning of the discriminator network 120 and the learning of the generator network 110 are completed, the test equipment 13 may test not all the wafers 11 but some sample wafers 11 and may generate wafer maps of the sample wafers 11, and the computing device 14 may execute the image generation model 100 and may generate wafer maps of the remaining wafers 11. Compared with the case where the test equipment 13 tests all the wafers 11 and generates wafer maps, a time and/or costs may be reduced by using the image generation model 100 of the computing device 14.

In some embodiments, the image generation model 100 may be stored in the memory 16 as a program code, that is, software and may be executed by the processor 15. In some example embodiments, the computing device 14 may include circuits in which the generator network 110 and the discriminator network 120 of the image generation model 100 are implemented physically and in hardware. In some embodiments, the image generation model 100 may be implemented in the form of hardware, software, or a combination thereof.

Figure 2:
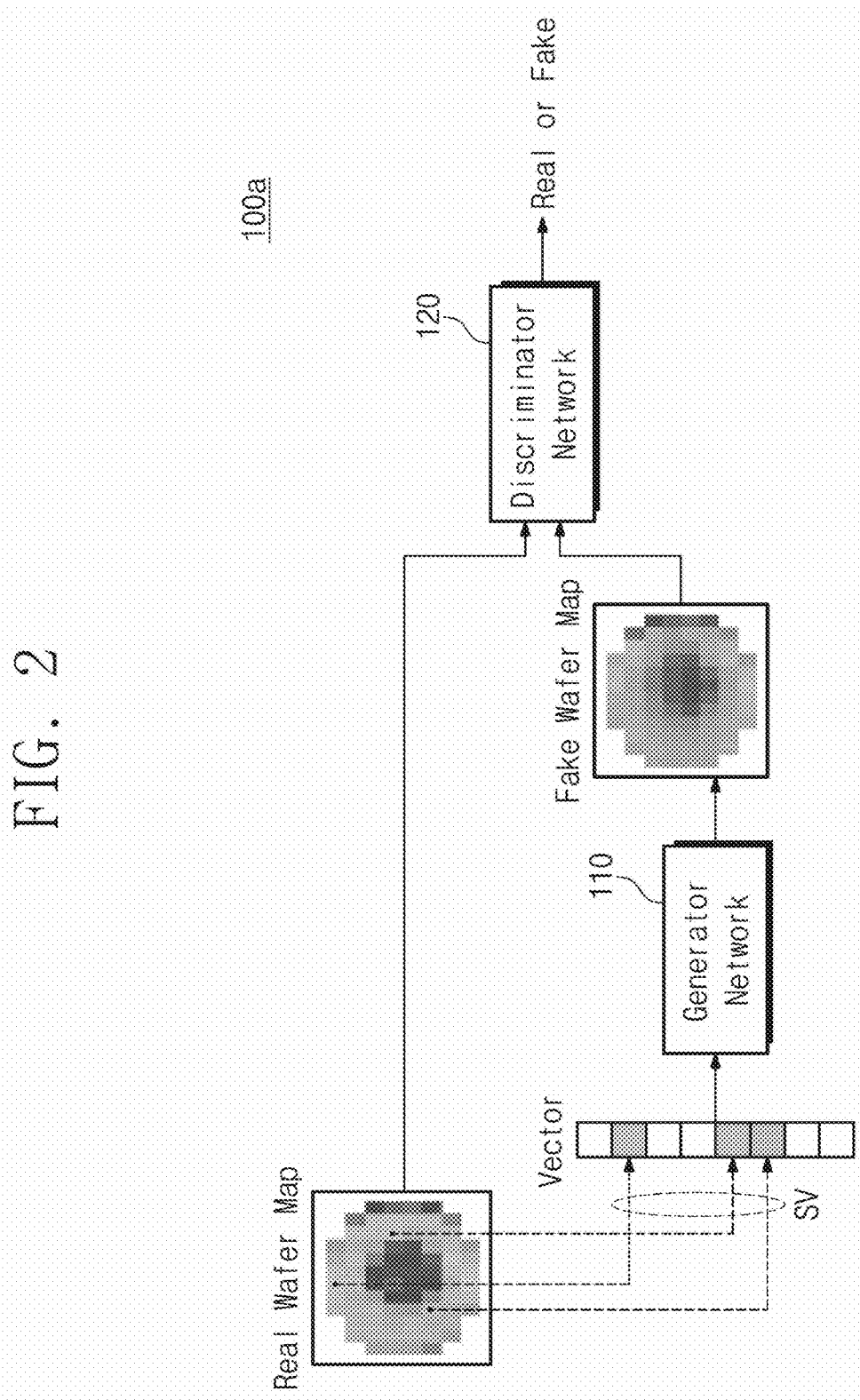
FIG. 2 illustrates an image generation model of FIG. 1 according to example embodiments of the inventive concepts in detail.

FIG. 2 illustrates an image generation model of FIG. 1 according to example embodiments of the inventive concepts in detail. An image generation model 100a is an example of the image generation model 100 of FIG. 1. The processor 15 may input a real wafer map transmitted from the test equipment 13 to the discriminator network 120 as a real wafer map and may perform the learning of the discriminator network 120. The processor 15 may generate an input vector including some of all the sampling values SV of the real wafer map. The processor 15 may input the input vector as input data to the generator network 110 and may perform the learning of the generator network 110. After the learning of the generator network 110 is completed, the processor 15 may generate an input vector including some of sampling values SV of any other wafer 11 transmitted from the test equipment 13 and may input the input vector as input data to the generator network 110. The generator network 110 may generate and output a wafer map based on the other wafer 11. Because a wafer map output from the generator network 110 is not a wafer map generated by the test equipment 13, the wafer map output from the generator network 110 corresponds to a fake wafer map.

For example, the processor 15 may generate the input vector including only some sampling values SV or may generate the input vector including any other values different from the some sampling values SV. The processor 15 may set any other values to values determined in advance, for example, to values adjacent to the some sampling values SV or to coordinate values indicating locations of some semiconductor dies 12 on the wafer 11, from which the some sampling values SV are measured. Alternatively, any other values may correspond to a random noise. The input vector may be a one-dimensional vector having any size. The processor 15 may input the input vector as input data to the generator network 110.

The processor 15 may provide the test equipment 13 with locations of some semiconductor dies 12 on the wafer 11 from which the some sampling values SV are measured or coordinates indicating the locations. For example, the interface circuit of the computing device 14 may transmit locations of some semiconductor dies 12 or coordinates indicating the locations to the test equipment 13. After the learning of the discriminator network 120 and the learning of the generator network 110 are completed by the processor 15, the test equipment 13 may test some semiconductor dies 12 on any other wafer 11 depending on the locations of the some semiconductor dies 12 transmitted from the computing device 14 and may transmit sampling data including some of the sampling values SV measured from the some semiconductor dies 12 to the computing device 14. The test equipment 13 may repeatedly test the some semiconductor dies 12 of the other wafer 11 depending on the locations of the some semiconductor dies 12 transmitted from the computing device 14 and may repeatedly transmit sampling data including some of the sampling values SV measured from the some semiconductor dies 12 to the computing device 14. The locations of the some semiconductor dies 12 on the wafer 11 from which the some sampling values SV are measured are not limited to the example illustrated in FIG. 2, and the processor 15 may randomly select locations of some semiconductor dies 12.

Figure 3:
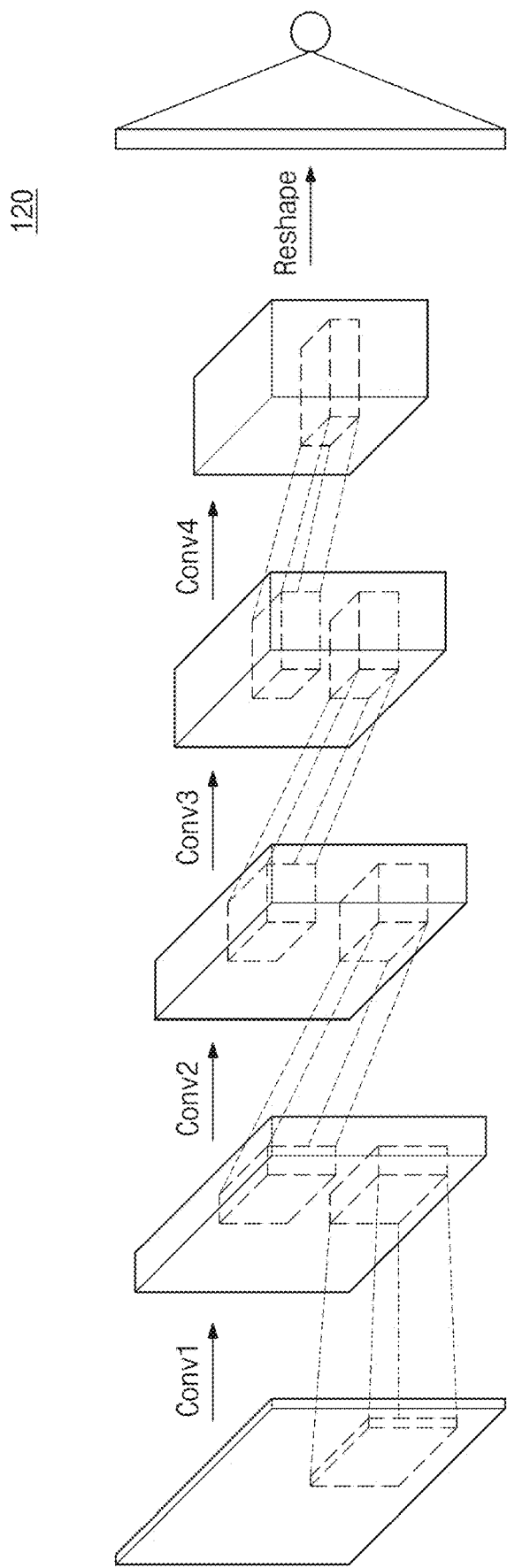
FIG. 3 schematically illustrates a procedure in which a wafer map is processed through a discriminator network of FIG. 2.

FIG. 3 schematically illustrates a procedure in which a wafer map is processed through a discriminator network of FIG. 2. FIG. 3 will be described with reference to FIG. 2.

The processor 15 may input a real wafer map or a fake wafer map to the discriminator network 120. A size (or dimension) of a wafer map may be gradually reduced as the wafer map passes through a plurality of layers of the discriminator network 120. For example, an operation of the discriminator network 120 may be similar to an operation of a convolutional neural network (CNN). The discriminator network 120 may extract features of the wafer map and may discriminate whether the wafer map is real or fake.

The discriminator network 120 may apply a filter (or a kernel or a matrix) to the wafer map, may repeatedly perform a convolution operation on sampling values of the wafer map corresponding to the filter and values of the filter (Conv1), and may generate a feature map. For example, the nodes of the discriminator network 120 of FIG. 1 may constitute a convolution layer Conv1 performing the above convolution operation. The discriminator network 120 may scale down a size (or a dimension) of the feature map by repeatedly performing an average pooling operation or a maximum pooling operation on the feature map output from the convolution layer Conv1 to which the wafer map is input. For example, the nodes of the discriminator network 120 of FIG. 1 may constitute a pooling layer performing the above pooling operation. Polling may be referred as "down-sampling". The wafer map may pass through a plurality of convolution layers Conv1 to Conv4 and a plurality of pooling layers of the discriminator network 120 under control of the processor 15, and the number of layers is not limited to the example illustrated in FIG. 3. One convolution layer and one pooling layer may be collectively regarded as one convolution/pooling layer.

The discriminator network 120 may reshape or transform a size (or dimension) of output data (or a feature map) passing through the plurality of convolution layers Conv1 to Conv4 and the plurality of pooling layers for the purpose of inputting the output data (or feature map) to a fully connected layer. The reshaping or transformation operation of FIG. 3 may be omitted if unnecessary. The discriminator network 120 may perform an activation operation on the output data passing through the plurality of convolution layers Conv1 to Conv4 and the plurality of pooling layers and may output a signal indicating whether the wafer map is real or fake. For example, the nodes of the discriminator network 120 of FIG. 1 may constitute the fully connected layer performing the above activation operation.

Figure 4:
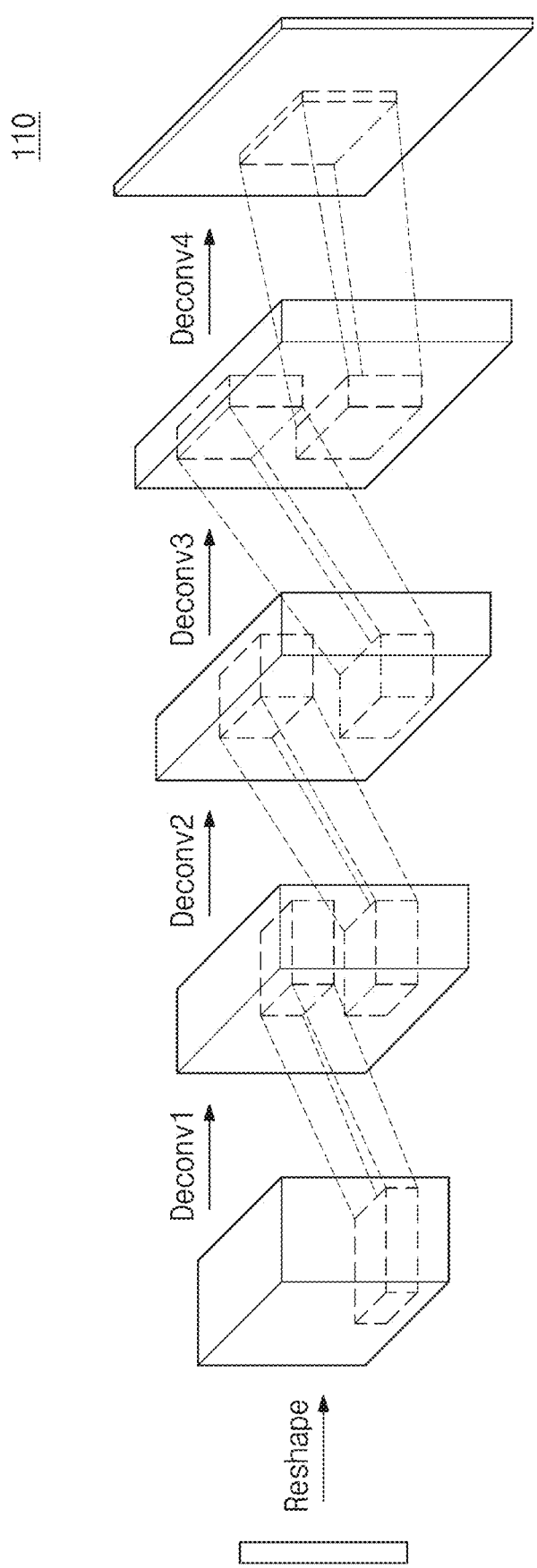
FIG. 4 schematically illustrates a procedure in which an input vector is processed through a generator network of FIG. 2.

FIG. 4 schematically illustrates a procedure in which an input vector is processed through a generator network of FIG. 2. FIG. 4 will be described with reference to FIGS. 2 and 3.

The processor 15 may input an input vector to the generator network 110. A size (or dimension) of the input vector may be gradually enlarged (or expanded) as the input vector passes through a plurality of layers of the generator network 110. For example, an operation of the generator network 110 may be reverse to the operation of the discriminator network 120 and may be similar to an operation of a deconvolution neural network. The generator network 110 may enlarge the size of the input vector to a size of a real wafer map.

The processor 15 may reshape or transform the size (or dimension) of the input vector for the purpose of inputting the input vector to a layer of the generator network 110. The reshaping or transformation operation of FIG. 4 may be omitted if unnecessary. The generator network 110 may enlarge the size (or dimension) of the input vector by repeatedly performing an unpooling operation on the input vector. Unpooling may be referred as "up-sampling". For example, the nodes of the generator network 110 of FIG. 1 may constitute an unpooling layer performing the above unpooling operation. The generator network 110 may repeatedly perform the deconvolution operation (or a transposed convolution operation) on a feature map (or output data) output from the unpooling layer (Deconv1) and may generate a feature map. For example, the nodes of the generator network 110 of FIG. 1 may constitute a deconvolution layer performing the above deconvolution operation. The input vector may pass through a plurality of unpooling layers and a plurality of deconvolution layers Deconv1 to Deconv4 of the generator network 110 under control of the processor 15, and the number of layers is not limited to the example illustrated in FIG. 4. One unpooling layer and one deconvolution layer may be collectively regarded as one unpooling/deconvolution layer. The generator network 110 may output a wafer map by allowing the input vector to pass through a plurality of unpooling layers and a plurality of deconvolution layers.

Figure 5:
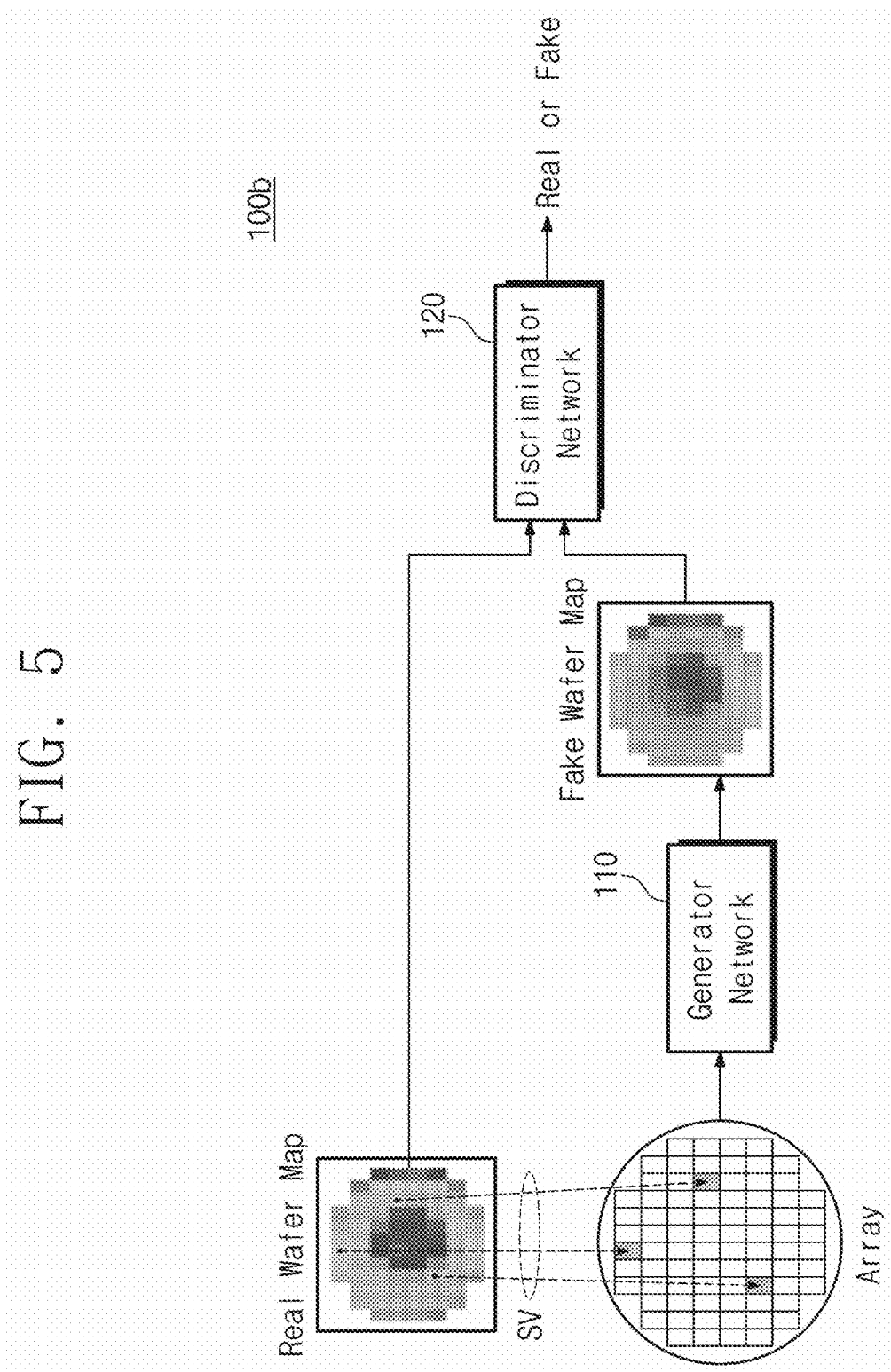
FIG. 5 illustrates an image generation model of FIG. 1 according to example embodiments of the inventive concepts in detail.

FIG. 5 illustrates an image generation model of FIG. 1 according to example embodiments of the inventive concepts in detail. An image generation model 100b is an example of the image generation model 100 of FIG. 1. A difference between the image generation model 100b and the image generation model 100a will be mainly described.

The processor 15 may generate not an input vector but an input array including some of all sampling values SV of a real wafer map. The processor 15 may input the input array as input data to the generator network 110 and may perform the learning of the generator network 110. After the learning of the generator network 110 is completed, the processor 15 may generate an input array including some of sampling values SV of any other wafer 11 transmitted from the test equipment 13 and may input the input array as input data to the generator network 110. The generator network 110 may generate and output a wafer map based on the other wafer 11.

For example, the processor 15 may arrange some sampling values SV on the input array depending on locations of some semiconductor dies 12 on the wafer 11 from which the some sampling values SV are measured. For example, the processor 15 may arrange the some sampling values SV on the input array depending on the locations of the some semiconductor dies 12 on the wafer 11 from which the some sampling values SV are measured. Values based on the some sampling values SV may be the some sampling values SV or may be values adjacent to the some sampling values SV. For example, the processor 15 may reshape or set a size of an input array, which includes some sampling values SV and values determined in advance or values based on the some sampling values SV, to a size of a wafer map. For example, the input array may be a two-dimensional vector corresponding to the size of the wafer map.

Figure 6:
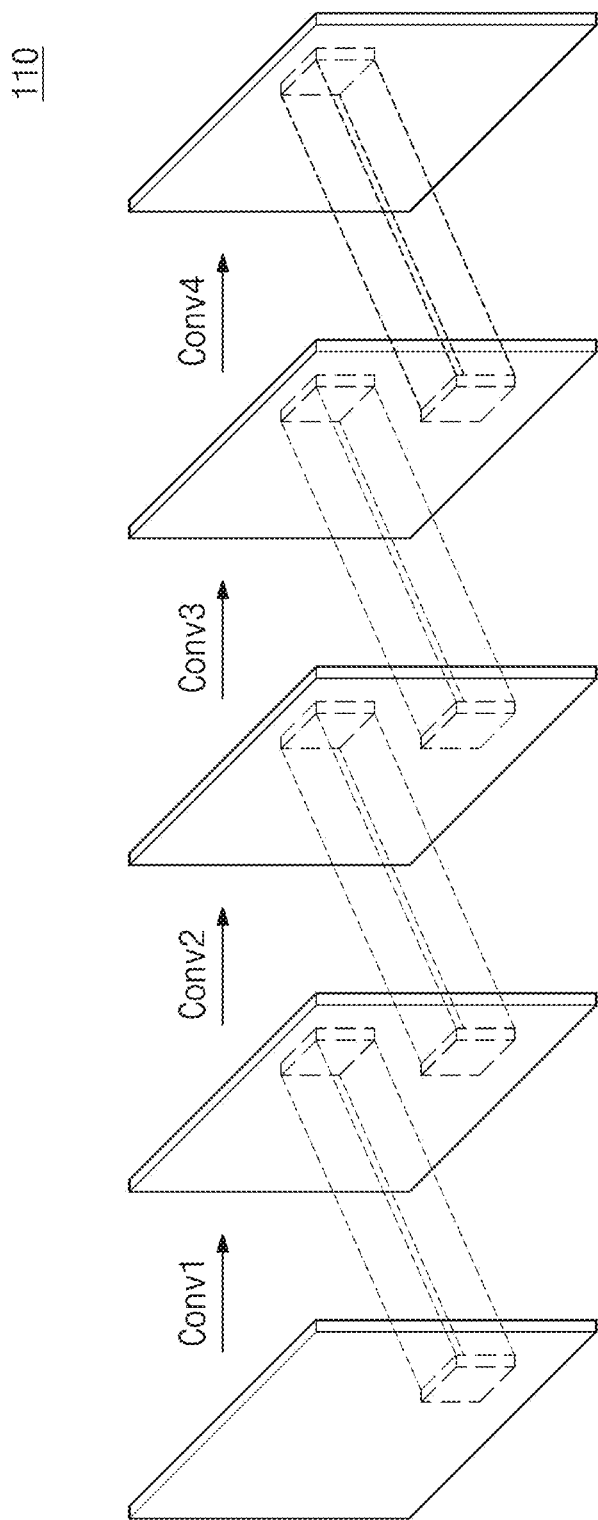
FIG. 6 schematically illustrates a procedure in which an input array is processed through a generator network of FIG. 5.

FIG. 6 schematically illustrates a procedure in which an input array is processed through a generator network of FIG. 5. FIG. 6 will be described with reference to FIGS. 3 to 5.

The processor 15 may input an input array to the generator network 110. A size (or dimension) of the input array may be gradually reduced or expanded as the input array passes through a plurality of layers of the generator network 110. Before inputting the input array to the generator network 110, the processor 15 may reshape or set a size of the input array to a size of a wafer map.

In some embodiments, an operation of the generator network 110 may be similar to an operation of the CNN. The generator network 110 may apply a filter to the input array, may repeatedly perform a convolution operation on sampling values of the input array corresponding to the filter and values of the filter (Conv1 to Conv4), and may generate a feature map. As described above, even though the convolution operation is performed, the generator network 110 may not reduce or expand the size of the input array and the size of the feature map. For example, the generator network 110 may apply padding to the input array and the feature map. For example, the nodes of the generator network 110 of FIG. 1 may constitute a convolution layer Conv1 performing the above convolution operation. The input array may pass through a plurality of convolution layers Conv1 to Conv4 of the generator network 110 under control of the processor 15, and the number of layers is not limited to the example illustrated in FIG. 6.

In some example embodiments, an operation of the generator network 110 may be similar to an operation of a deconvolution neural network. The generator network 110 may generate a feature map by repeatedly performing the deconvolution operation (or the transposed convolution operation) on the input array. For example, the nodes of the generator network 110 of FIG. 1 may constitute a deconvolution layer performing the above deconvolution operation. The input array may pass through the plurality of deconvolution layers of the generator network 110 under control of the processor 15. In some embodiments, the generator network 110 of FIG. 6 may not perform an unpooling operation or an up-sampling operation on the input array. Also, the generator network 110 may not include the fully connected layer described with reference to FIG. 3.

Figure 7:
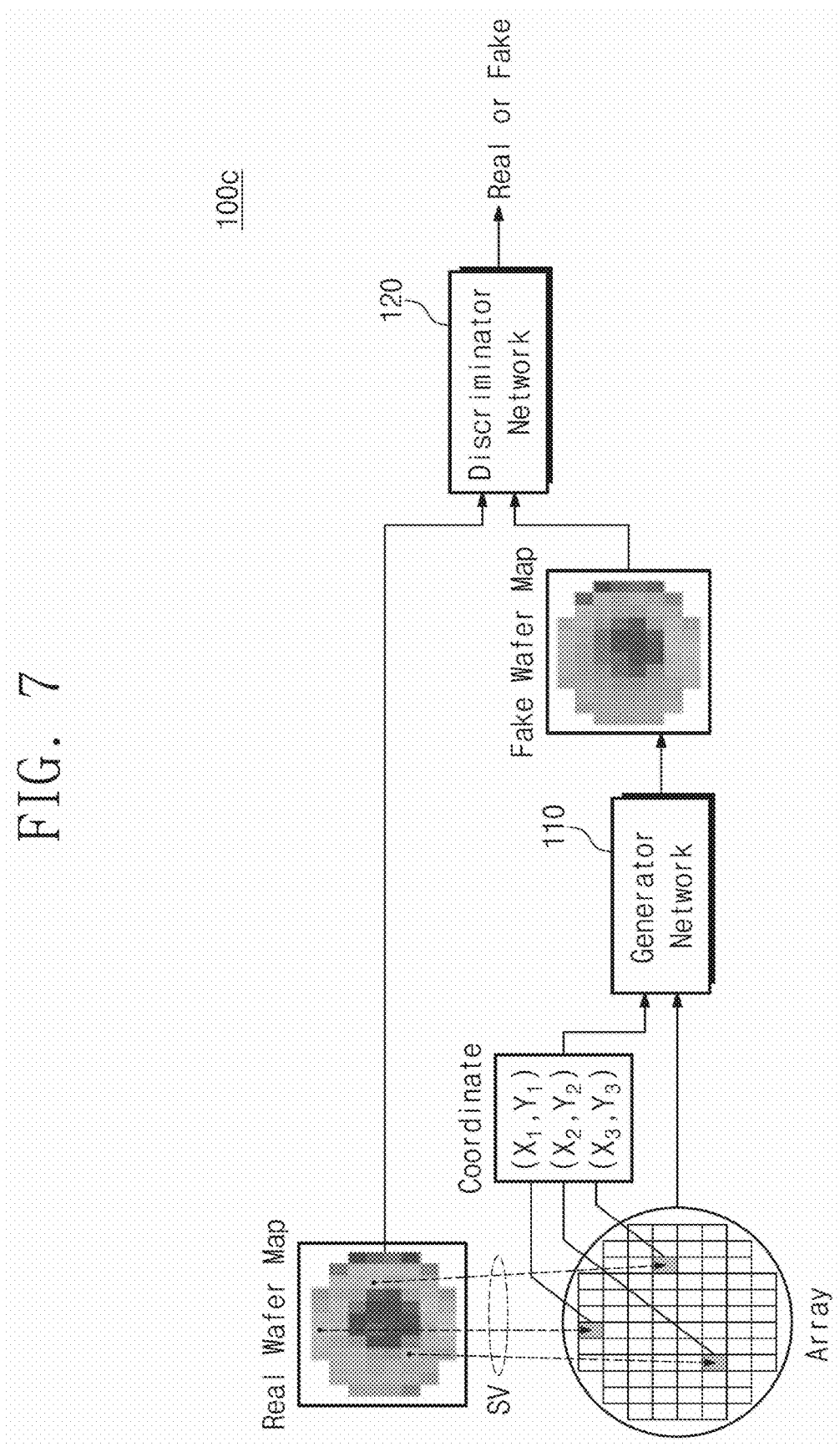
FIG. 7 illustrates an image generation model of FIG. 1 according to example embodiments of the inventive concepts in detail.

FIG. 7 illustrates an image generation model of FIG. 1 according to example embodiments of the inventive concepts in detail. An image generation model 100c is an example of the image generation model 100 of FIG. 1. A difference between the image generation model 100c and the image generation model 100b will be mainly described.

The processor 15 may generate input data including an input array and coordinate values $(X_1, Y_1)$, $(X_2, Y_2)$, and $(X_3, Y_3)$ indicating locations of some semiconductor dies 12 on the wafer 11 from which some sampling values SV are measured and may input the input data to the generator network 110. For example, the coordinate values $(X_1, Y_1)$, $(X_2, Y_2)$, and $(X_3, Y_3)$ may be based on a Cartesian coordinate system.

Figure 8:
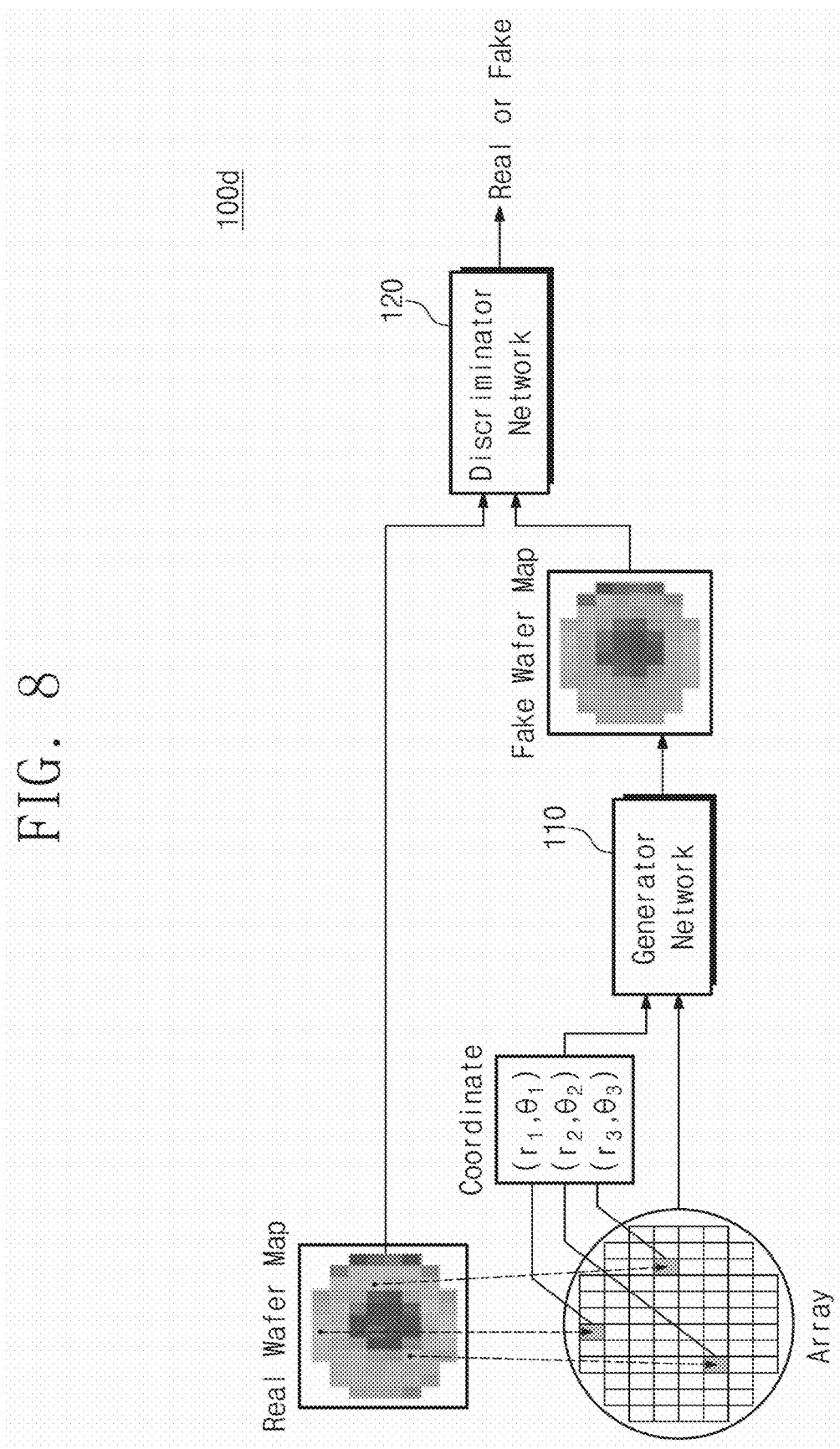
FIG. 8 illustrates an image generation model of FIG. 1 according to example embodiments of the inventive concepts in detail.

FIG. 8 illustrates an image generation model of FIG. 1 according to example embodiments of the inventive concepts in detail. An image generation model 100d is an example of the image generation model 100 of FIG. 1. A difference between the image generation model 100d and the image generation model 100b will be mainly described.

The processor 15 may generate input data including an input array and coordinate values $(r_1, \theta_1)$, $(r_2, \theta_2)$, and $(r_3, \theta_3)$ indicating locations of some semiconductor dies 12 on the wafer 11 from which some sampling values SV are measured and may input the input data to the generator network 110. For example, the coordinate values $(r_1, \theta_1)$, $(r_2, \theta_2)$, and $(r_3, \theta_3)$ may be based on a polar coordinate system that uses the center of the wafer 11 as the origin.

In some embodiments, the processor 15 may further input a process parameter as input data to the generator network 110 of the image generation models 100a to 100d described with reference to FIGS. 2 to 8. For example, the process parameter may include a parameter associated with equipment manufacturing the wafer 11, a parameter associated with the test equipment 13 testing the wafer 11, a process condition associated with the wafer 11, etc. The process parameter may include the following information about the wafer 11: temperature, pressure, and/or size.

Figure 9:
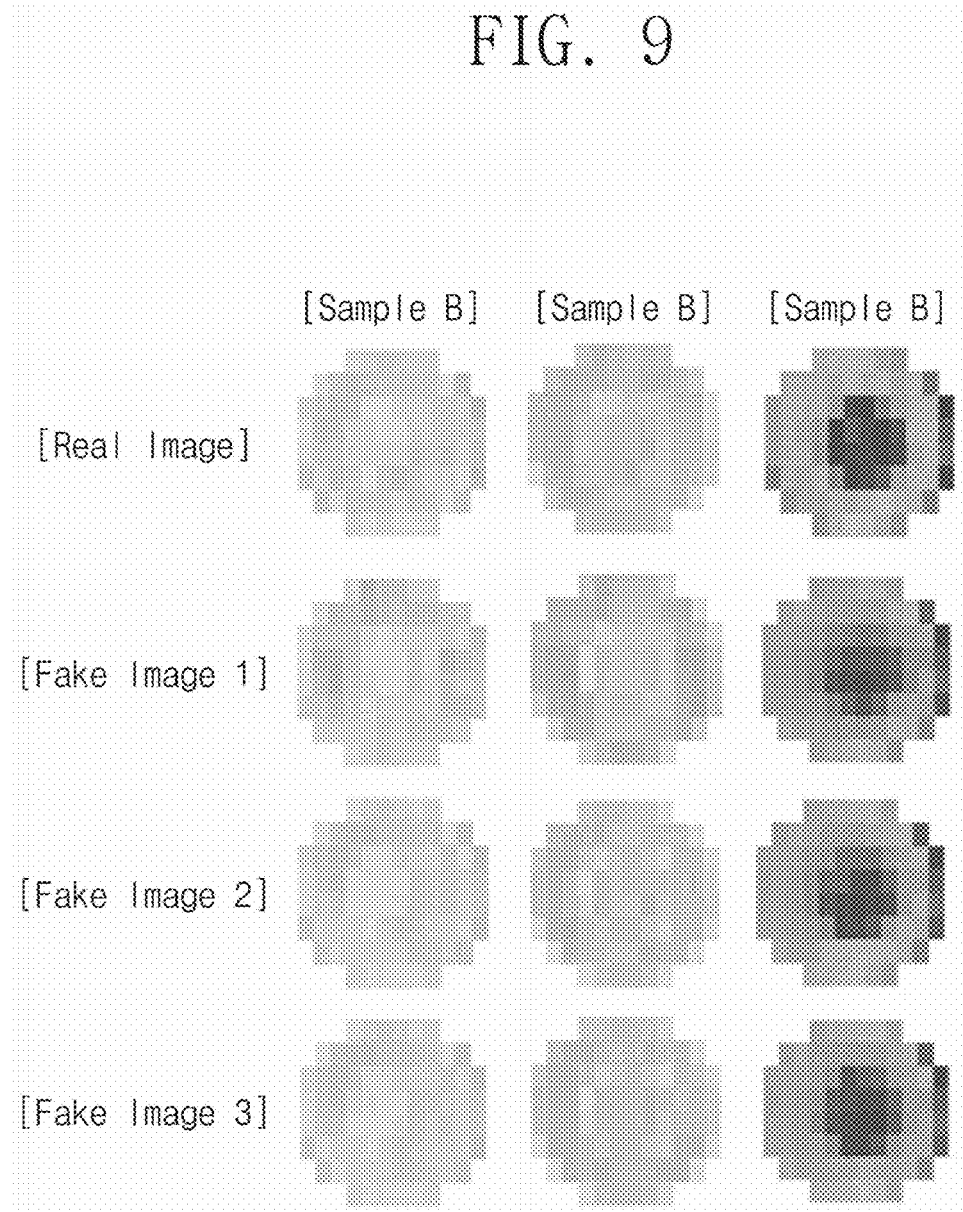
FIG. 9 illustrates real images of sample wafers and fake images generated by image generation models described with reference to FIGS. 5 to 8.

FIG. 9 illustrates real images of sample wafers and fake images generated by image generation models described with reference to FIGS. 5 to 8. Wafer maps of sample wafers "A", "B", and "C" are exemplified at a row of real images of FIG. 9. The generator network 110 of the image generation model 100*b* may receive some sampling values measured from some semiconductor dies of the sample wafers "A", "B", and "C" and may generate and output wafer maps of the sample wafers "A", "B", and "C". The wafer maps generated by the generator network 110 of the image generation model 100 are exemplified at a row of first fake images of FIG. 9. The generator network 110 of the image generation model 100*c* may receive some sampling values from some semiconductor dies of the sample wafers "A", "B", and "C" and may generate and output wafer maps of the sample wafers "A", "B", and "C". The wafer maps generated by the generator network 110 of the image generation model 100 are exemplified at a row of second fake images of FIG. 9. The generator network 110 of the image generation model 100*d* may receive some sampling values from some semiconductor dies of the sample wafers "A", "B", and "C" and may generate and output wafer maps of the sample wafers "A", "B", and "C". The wafer maps generated by the generator network 110 of the image generation model 100 are exemplified at a row of third fake images of FIG. 9.

Figure 10:
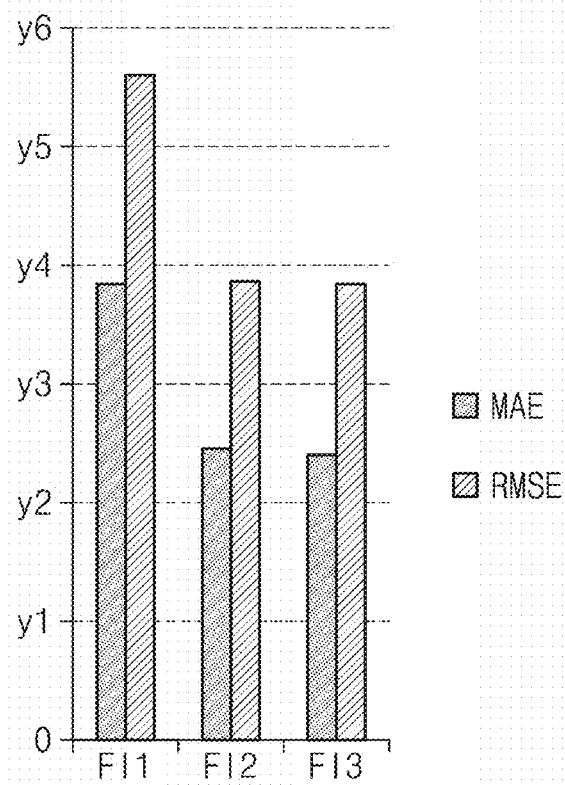
FIG. 10 illustrates an error between a real image and a fake image of FIG. 9.

FIG. 10 illustrates an error between a real image and a fake image of FIG. 9. An error may be a mean absolute error (MSE) or a root mean squared error (RMSE) that is based on differences between sampling values of pixels of a real image (e.g., a wafer map generated by the test equipment 13) and sampling values of pixels of a fake image (e.g., a wafer map generated by the generator network 110 of the image generation model 100). In FIG. 10, "FI" is the abbreviation for a fake image. FI1 may indicate a wafer map generated by the generator network 110 of the image generation model 100*b*. The MAE and the RMSE between a wafer map of the test equipment 13 and a wafer map generated by the generator network 110 of the image generation model 100*b* may belong to a range from y3 to y4 and a range from y5 to y6, respectively. FI2 may indicate a wafer map generated by the generator network 110 of the image generation model 100*c*, and FI3 may indicate a wafer map generated by the generator network 110 of the image generation model 100*d*. Compared to the generator network 110 of the image generation model 100*b*, coordinate information may be further input to the generator network 110 of each of the image generation models 100*c* and 100*d*. Compared to the generator network 110 of the image generation model 100*b*, the MAE and the RMSE between a wafer map of the test equipment 13 and a wafer map generated by the generator network 110 of the image generation model 100*c*/100*d* may further decrease. The MAE and the RMSE between a wafer map of the test equipment 13 and a wafer map generated by the generator network 110 of the image generation model 100*c*/100*d* may belong to a range from y2 to y3 and a range from y3 to y4, respectively.

Figure 11:
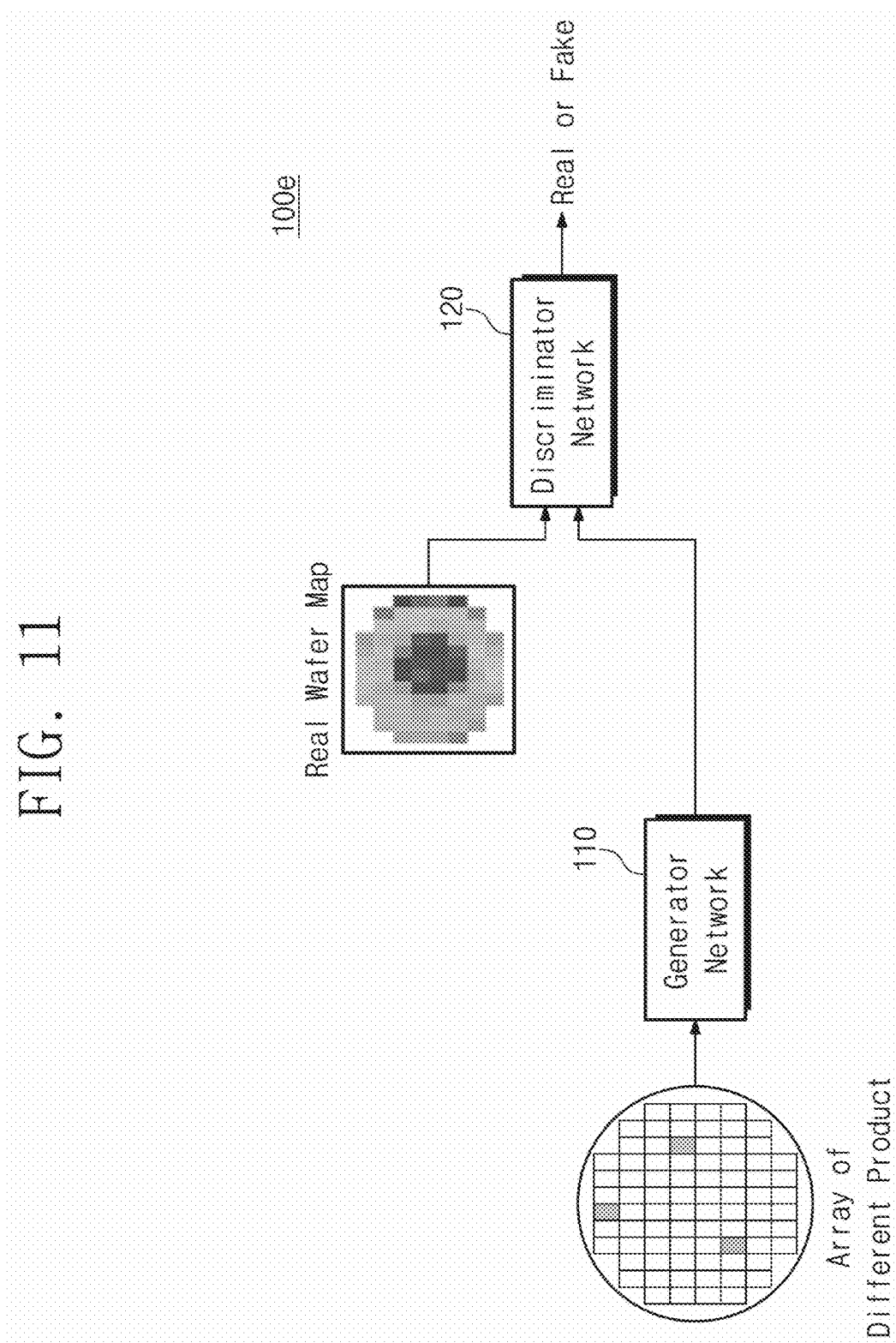
FIG. 11 illustrates an image generation model of FIG. 1 according to example embodiments of the inventive concepts in detail.

FIG. 11 illustrates an image generation model of FIG. 1 according to example embodiments of the inventive concepts in detail. An image generation model 100*e* may be the image generation models 100*b* to 100*d* described above. The image generation model 100*e* may include the generator network 110 and the discriminator network 120 that are learned by the processor 15 with respect to the wafer 11 of any one product. The image generation model 100*e* of FIG. 11 may be in a state of being learned by the processor 15 with respect to any one product.

The processor 15 may generate input data on the wafer 11 of the other product and may input the input data to the generator network 110. An example is illustrated in FIG. 11 as the input data are an input array, but the processor 15 may generate input data on the wafer 11 of the other product depending on example embodiments described with reference to FIGS. 2 to 8. The processor 15 may generate, as input data, at least one of an input vector including sampling values measured from some semiconductor dies of the wafer 11 of the other product, an input array, and coordinates of some semiconductor dies on the wafer 11. The generator network 110 may generate a wafer map of the wafer 11 of the other product from the input data.

Figure 12:
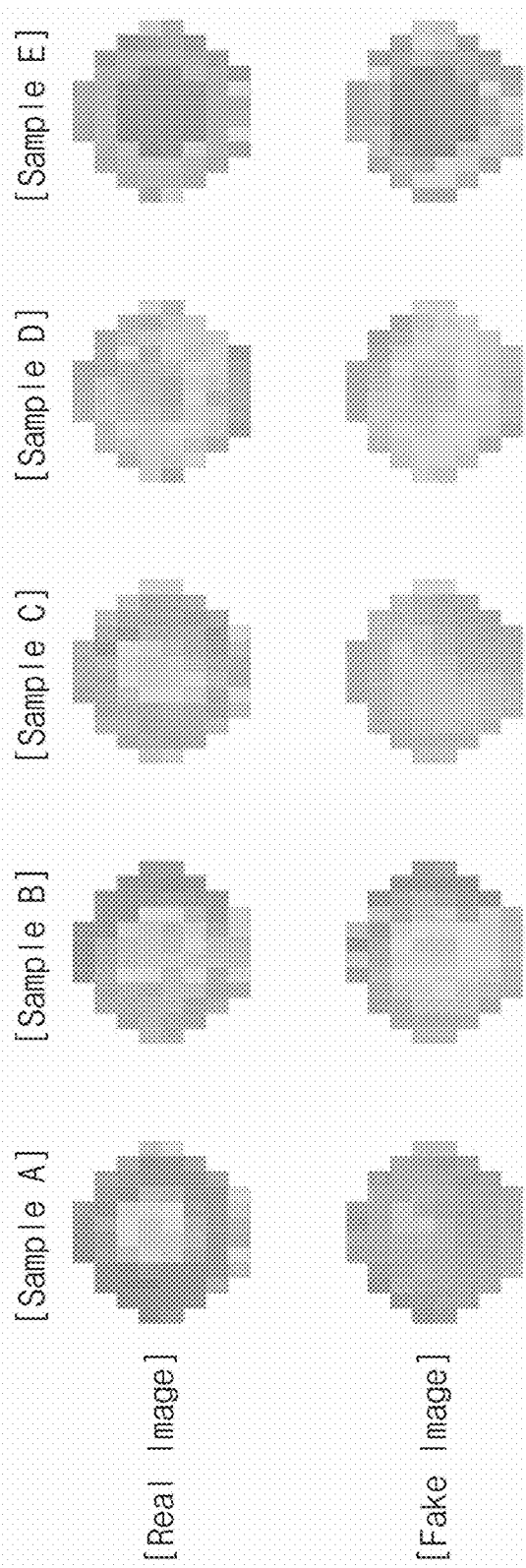
FIG. 12 illustrates real images of any other wafer and fake images generated by an image generation model of FIG. 11.

FIG. 12 illustrates real images of any other wafer and fake images generated by an image generation model of FIG. 11. Wafer maps of sample wafers "A", "B", "C", "D", and "E" are exemplified at a row of real images of FIG. 12. The generator network 110 of the image generation model 100*e* may receive some sampling values measured from some semiconductor dies of the sample wafers "A", "B", "C", "D", and "E" and may generate and output wafer maps of the sample wafers "A", "B", "C", "D", and "E". The wafer maps generated by the generator network 110 of the image generation model 100 are exemplified at a row of fake images of FIG. 12. Referring to FIG. 12, the wafer maps of the fake images may be similar to the wafer maps of the real images.

FIG. 13 is a flowchart illustrating operations in which a processor according to example embodiments of the inventive concepts performs learning of an image generation model stored in a memory, executes the learned image generation model, and generates a wafer map. The flowchart of FIG. 13 will be described with reference to FIGS. 1 and 12.

In operation S110, the computing device 14 may receive a wafer map from the test equipment 13. The wafer map received in operation S110 may indicate characteristics of all the semiconductor dies 12 of the wafer 11 and may be generated by the test equipment 13. In operation S120, the processor 15 may input the wafer map of operation S110 to the discriminator network 120 of the image generation model 100.

In operation S130, the processor 15 may perform the learning of the discriminator network 120 so that the wafer map received in operation S110 is discriminated by the discriminator network 120 as real. The processor 15 may update or adjust weights or biases of the nodes of the discriminator network 120 based on a discrimination result of the discriminator network 120.

In operation S140, the processor 15 may perform the learning of the discriminator network 120 so that the wafer map output from the generator network 110 is discriminated as real by the discriminator network 120. The processor 15 may update or adjust weights or biases of the nodes of the discriminator network 120 based on a discrimination result of the discriminator network 120.

In operation S150, the processor 15 may generate data including some of sampling values of the wafer map received in operation S110. The processor 15 may input the generated data to the generator network 110 of the image generation model 100. In addition to sampling values, the processor 15 may further include coordinate values indicating locations of some semiconductor dies 12 on the wafer 11 from which some sampling values are measured, in data to be input to the generator network 110. Also, the processor 15 may generate a one-dimensional input vector including data to be input to the generator network 110 or may generate an input array (e.g., a two-dimensional input vector corresponding to a wafer) (refer to FIGS. 5 to 8).

In operation S160, the processor 15 may perform the learning of the discriminator network 120 so that the wafer map output from the generator network 110 in operation S150 is discriminated as real by the discriminator network 120. The processor 15 may update or adjust weights or biases of the nodes of the generator network 110 based on a discrimination result of the discriminator network 120.

In operation S170, the processor 15 may receive sampling values of any other wafer 11. The other wafer 11 may be distinguished from the wafer 11 of operation S100. A product of the plurality of semiconductor dies 12 on the wafer 11 of operation S170 may be identical to or different from a product of the plurality of semiconductor dies 12 on the wafer 11 of operation S110.

As in operation S150, in operation S180, the processor 15 may generate data including the sampling values received in operation S170. The processor 15 may input the generated data to the generator network 110, and the generator network 110 may generate and output a wafer map of the other wafer 11. Operation S170 and operation S180 may be repeatedly performed on one or more wafers 11.

In some embodiments, the processor 15 may perform operation S110 to operation S160 on the wafer 11 in which any one product is implemented. Next, the processor 15 may further perform operation S110 to operation S160 on the wafer 11 in which any other product is implemented. For example, the processor 15 may perform the learnings of the generator network 110 and the discriminator network 120 of the image generation model 100 on both any one product and any other product.

According to example embodiments of the inventive concepts, test equipment may generate wafer maps of sample wafers by testing the sample wafers (or dies), not all wafers (or dies), and a computing device may execute an image generation model to generate wafer maps of the remaining wafers. Accordingly, time and/or cost may be reduced compared to some embodiments where the test equipment tests all wafers (or dies).

The computing device 14 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In some embodiments, the IGN in FIG. 1 may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. A non-transitory computer-readable medium storing a program code including an image generation model, which when executed, causes a processor to:
   train a generator network of the image generation model to generate a wafer image by inputting input data including sampling data of some of a plurality of semiconductor dies of a wafer to the generator network of the image generation model;
   output a wafer map indicating the plurality of semiconductor dies generated during the training of the generator network;
   input the wafer map output from the generator network to a discriminator network of the image generation model such that the discriminator network discriminates the wafer map generated during the training; and
   perform additional training of the generator network based on a discrimination result of the discriminator network correctly differentiating the generated wafer map from a real wafer map.

2. The non-transitory computer-readable medium of claim 1, wherein the image generation model, which when executed, causes the processor to:
   arrange the sampling data on the input data depending on locations of the some semiconductor dies of the wafer.

3. The non-transitory computer-readable medium of claim 1, wherein the image generation model, which when executed, causes the processor to:
   generate the input data including the sampling data and at least one of a first value determined in advance and a second value based on the sampling data.

4. The non-transitory computer-readable medium of claim 3, wherein the image generation model, which when executed, causes the processor to:
   dispose a sampling value of the sampling data on the input data depending on a location of a first semiconductor die of the some semiconductor dies; and
   dispose the at least one of the first value and the second value on the input data depending on a location of a second semiconductor die of the remaining semiconductor dies of the plurality of semiconductor dies.

5. The non-transitory computer-readable medium of claim 1, wherein the image generation model, which when executed, causes the processor to:
   reshape a size of the input data to a size of the wafer map.

6. The non-transitory computer-readable medium of claim 1, wherein the image generation model, which when executed, causes the processor to:
   reshape a size of the input data to a one-dimensional vector.

7. The non-transitory computer-readable medium of claim 1, wherein the image generation model, which when executed, causes the processor to:
   generate the input data including the sampling data and coordinate values indicating locations of the some semiconductor dies of the wafer.

8. The non-transitory computer-readable medium of claim 7, wherein the coordinate values are based on one of a Cartesian coordinate system and a polar coordinate system.

9. The non-transitory computer-readable medium of claim 1, wherein the plurality of semiconductor dies are a plurality of first semiconductor dies and the wafer is a first wafer, and
wherein the image generation model, which when executed, causes the processor to:
execute the generator network learned based on the discrimination result and generate a wafer map of a second wafer including a plurality of second semiconductor dies.

10. The non-transitory computer-readable medium of claim 1, wherein the image generation model, which when executed, causes the processor to:
generate the input data including the sampling data and a process parameter of the wafer.

11. A non-transitory computer-readable medium storing a program code including an image generation model, which when executed, causes a processor to:
perform learning of a discriminator network of the image generation model so that the discriminator network discriminates a first wafer map including a plurality of sampling values measured from a plurality of semiconductor dies of a wafer as real and discriminates a second wafer map output from a generator network of the image generation model, to which some of the plurality of sampling values are input, as fake; and
perform learning of the generator network so that the second wafer map output from the generator network is discriminated as real by the discriminator network.

12. The non-transitory computer-readable medium of claim 11, wherein the image generation model, which when executed, causes the processor to:
input input data including the some sampling values and coordinate values of some semiconductor dies, from which the some sampling values are measured, from among the plurality of semiconductor dies to the generator network.

13. The non-transitory computer-readable medium of claim 11, wherein the plurality of semiconductor dies are a plurality of first semiconductor dies, the wafer is a first wafer, and the plurality of sampling values are a plurality of first sampling values,
wherein the image generation model, which when executed, causes the processor to:
perform learning of the discriminator network so that the discriminator network discriminates a third wafer map including a plurality of second sampling values respectively measured from a plurality of second semiconductor dies as real and discriminates a fourth wafer map output from the generator network, to which some of the plurality of second sampling values are input, as fake; and
perform learning of the generator network so that the fourth wafer map output from the generator network is discriminated as real by the discriminator network.

14. The non-transitory computer-readable medium of claim 11, wherein the image generation model, which when executed, causes the processor to:
input input data including the some sampling values and a process parameter of the wafer to the generator network.

15. The non-transitory computer-readable medium of claim 11, wherein the generator network outputs the second wafer map from input data including the some sampling values without up-sampling.

16. A computing device comprising a processor configured to execute an image generation model stored in a memory, wherein the processor is configured to:
perform learning of a discriminator network of the image generation model so that the discriminator network discriminates a first wafer map of a first wafer including a plurality of first sampling values measured from a plurality of first semiconductor dies of the first wafer as real and discriminates a second wafer map of the first wafer output from a generator network of the image generation model, to which some of the plurality of first sampling values are input, as fake;
perform learning of the generator network so that the second wafer map output from the generator network is discriminated as real by the discriminator network; and
input some of second sampling values measured from some of a plurality of second semiconductor dies of a second wafer to the generator network and generate a third wafer map of the second wafer.

17. The computing device of claim 16, wherein locations of the some second sampling values on the third wafer map respectively correspond to locations of the some first sampling values on the second wafer map.

18. The computing device of claim 16, wherein the processor is configured to:
input input data including the some first sampling values and coordinate values of some semiconductor dies, from which the some first sampling values are measured, from among the plurality of first semiconductor dies to the generator network.

19. The computing device of claim 16, wherein the processor is configured to:
input input data including the some first sampling values and a process parameter of the first wafer to the generator network.

* * * * *